(No Model.) 2 Sheets—Sheet 1.
E. F. O'TOOLE.
SHEET METAL RECEPTACLE FOR FIRE EXTINGUISHING CHEMICALS.
No. 542,491. Patented July 9, 1895.
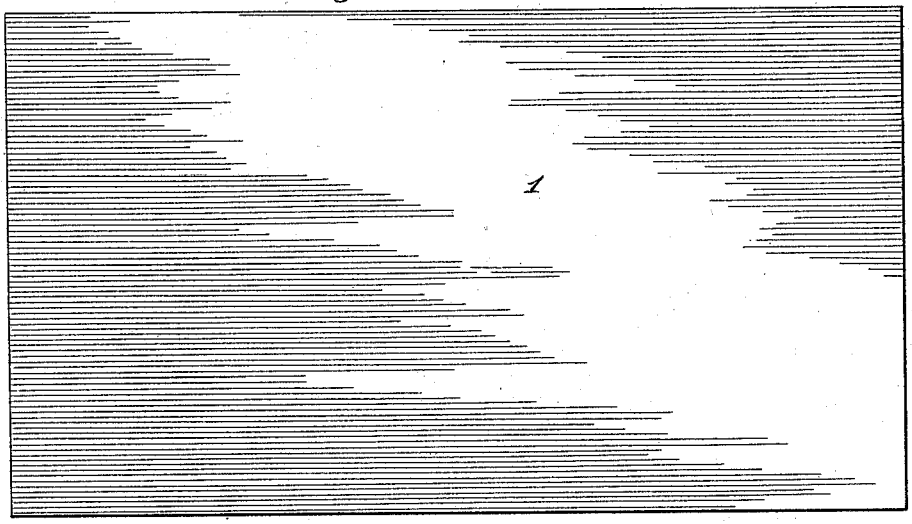
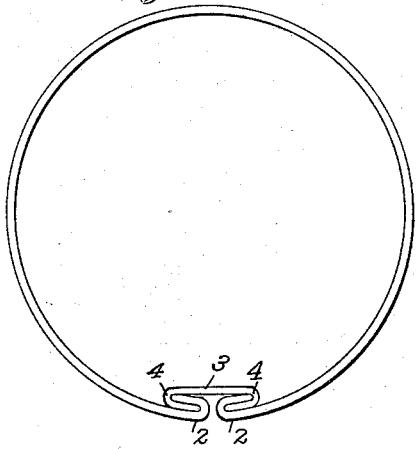
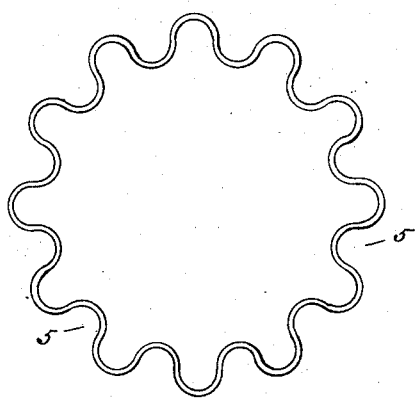
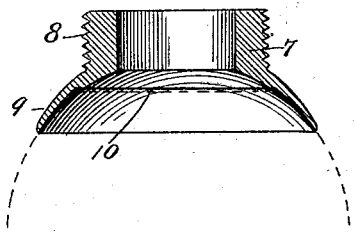
Attest
John L. Tunison
M. P. Smith
Inventor
E. F. O'Toole
By Higdon & Higdon & Longan, Attys (No Model.) 2 Sheets—Sheet 2.
E. F. O'TOOLE.
SHEET METAL RECEPTACLE FOR FIRE EXTINGUISHING CHEMICALS.
No. 542,491. Patented July 9, 1895.
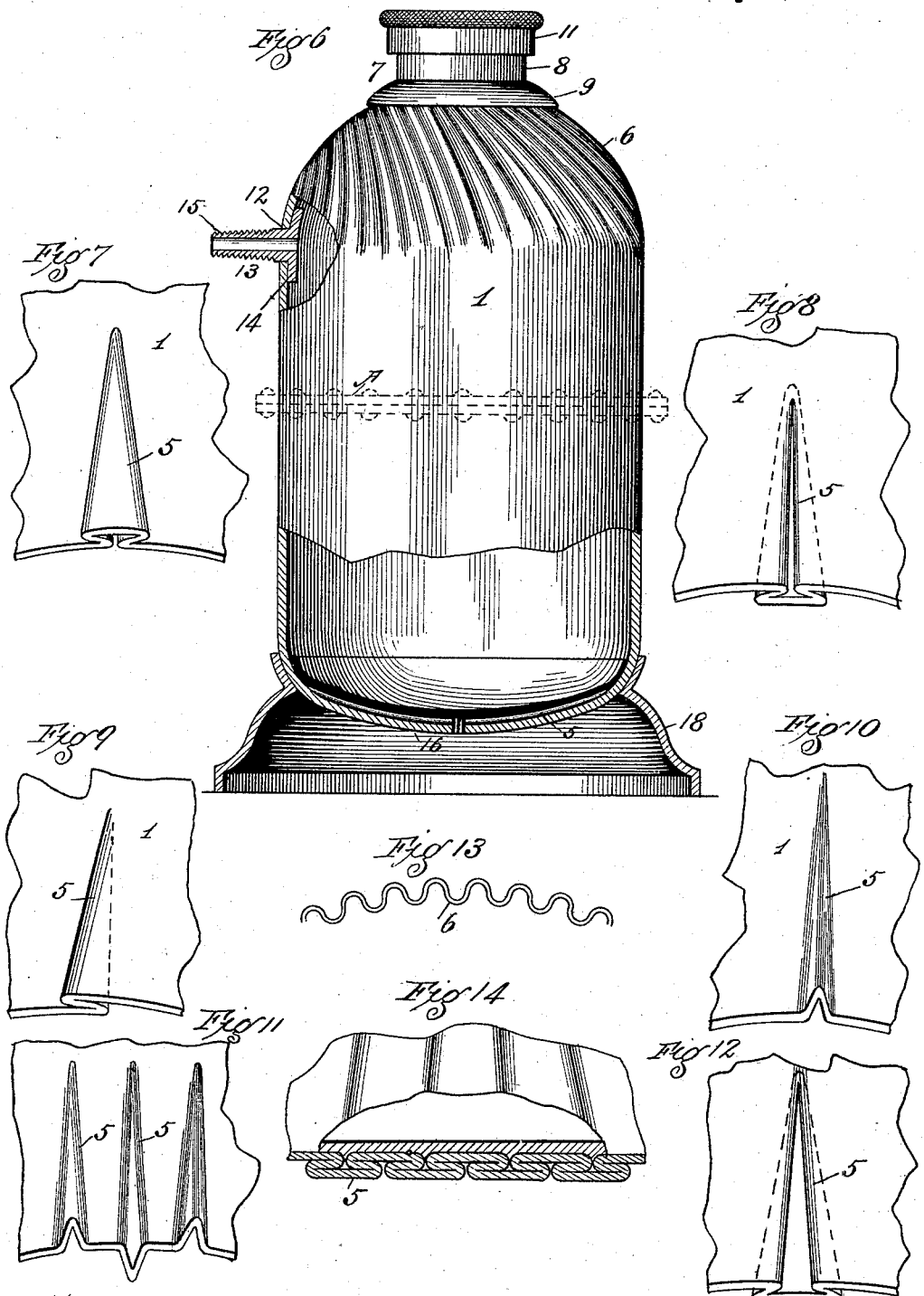

UNITED STATES PATENT OFFICE.

EDWARD F. O'TOOLE, OF ST. LOUIS, MISSOURI.

SHEET-METAL RECEPTACLE FOR FIRE-EXTINGUISHING CHEMICALS.

SPECIFICATION forming part of Letters Patent No. 542,491, dated July 9, 1895.

Application filed March 19, 1894. Serial No. 504,351. (No model.)

*To all whom it may concern:*

Be it known that I, EDWARD F. O'TOOLE, of the city of St. Louis, State of Missouri, have invented certain new and useful Improvements in Sheet-Metal Receptacles for Fire-Extinguishing Chemicals, Soda-Water, &c., of which the following is a full, clear, and exact description, reference being had to the accompanying drawings, forming a part hereof.

The object of my invention is to construct an improved sheet-metal vessel for chemicals, soda-water, &c., out of a single piece of sheet metal.

A further object of my invention is to provide an improved and very strong vessel that can be easily and cheaply constructed, and at the same time to construct such a vessel with a great saving of labor.

To the above purposes my invention consists in certain new and novel features that will be hereinafter described and claimed.

Figure 1 is a sheet-metal blank out of which the vessel is formed and before it is bent into cylindrical form or corrugated. Fig. 2 is a cross-sectional view of the vessel, showing the method of forming the seam in same. Fig. 3 shows the first step in forming the corrugations such as is contemplated by my invention. Fig. 4 is a cross-sectional view of the neck of my vessel, Fig. 5 being a cross-sectional view of the screw-threaded cap adapted to engage upon the neck. Fig. 6 is a side elevation of my complete vessel, portions being broken away to more clearly show the same. Figs. 7, 8, 9, 10, 11, and 12 are detail views of the different forms of corrugations I may make use of in carrying out my invention. Fig. 13 is a view showing a section of the corrugations as used on the top of my improved vessel. Fig. 14 is a sectional view of a portion of the bottom of my vessel and showing the corrugations covered with solder or other suitable material.

Similar numerals refer to similar parts throughout the several views.

The numeral 1 designates the piece of sheet metal out of which the body of my vessel is formed. This is first bent into cylindrical form, as shown by Fig. 2, the meeting ends 2 of which are turned inwardly, and a strip 3, having its edges 4 bent to the desired position, fitted over these ends 2. When these ends are firmly pressed together, it forms a very substantial seam. The lower end of the cylinder so formed is now corrugated, as shown in Fig. 3, the corrugations being numbered 5. The top portion of the cylinder is now corrugated and brought together, as shown in Fig. 6. These corrugations 6 are shown in section in Fig. 13 and start from a point on the cylindrical periphery of the cylinder near its top portion and extend either diagonally or spirally upward. These corrugations are made in such a manner and of such proportions that they become deeper after they leave the starting-point and approach the upper end of the cylinder, so that said upper end will be contracted, thus making the diameter of the opening of said cylinder bear a ratio to the diameter of said cylinder depending upon the proportions of the corrugations. After said corrugations have been made the cylinder will be put into a special machine (not shown) and the upper end of the cylinder will be spun or otherwise operated on so that the corrugations will be made more or less spiral and caused to lie close against each other, and the said upper end of the cylinder will be made dome-shaped.

The neck 7, which consists of the circular portion 8, exteriorly screw-threaded, and downwardly-extending portion 9, having an annular groove 10 on its inner surface for the reception of the preferably-flattened upper ends of the corrugations 6, is now fitted upon the top of the vessel. It is here soldered or held in any suitable and substantial manner. The cap 11, interiorly screw-threaded, is adapted to fit immediately upon the portion 8 of the neck 7.

An aperture 12 is formed at any suitable point in the wall of the cylinder near the upper or top corrugations. In this aperture 12 may be located a spout or short pipe 13, which has a flange 14, adapted to be fitted against and soldered to the inner wall of the vessel. Its outer end 15 may be exteriorly screw-threaded to receive a hose or cap, as desired.

After the corrugations 5 have been formed in the bottom of the vessel, as shown in Fig. 3, said corrugations are pressed into any of the different positions shown in Figs. 7 to 12, inclusive. By properly pressing the corrugations the lower ends of the same will be brought together and caused to meet on the axis of said cylinder and thus form the corrugated dome-shaped bottom 16.

In the form of corrugation shown in Fig. 7 the outwardly-extending corrugation is pressed flat against the inner corrugation. This is done by any suitable machinery, not necessary to be described. In the form shown in Fig. 8 the inwardly-extending corrugation is pressed flat against the outwardly-extending corrugation, this really being a reverse of the corrugation shown in Fig. 7. In the form shown in Fig. 9 each outwardly-extending corrugation is pressed over sidewise. In the form shown in Fig. 10 each outwardly-extending corrugation is pressed together, thus making it extend at right angles to the wall of the vessel. In the form shown in Fig. 11 the corrugations are alternately formed outwardly and inwardly and at right angles to the main wall of the cylinder. In Fig. 12 the form shown is similar to the form shown in Fig. 8, excepting that said corrugations are made wider. When these corrugations have been pressed firmly together, as shown in Fig. 6, a suitable quantity of molten solder 17, or other suitable material, is introduced through the neck of the vessel and placed upon the bottom 16 thereof, thus firmly holding all the corrugations together, filling in the interstices or crevices, and making a thoroughly air and water tight bottom to the vessel. The vessel is now placed upon a suitable base or standard 18, and securely held thereto by solder or rivets.

When it is desired to make the vessel in the form of a carboy, the base 18 is dispensed with and the vessel made in two parts, the meeting ends of said parts being brought together and riveted, as shown by the dotted lines A in Fig. 6. By thus forming a vessel out of a single sheet of metal and with the corrugations, as shown, it will be seen how I can form such vessel with much less labor than such vessels are now constructed with.

The vessel can be made in various shapes and sizes, all being much less expensive than the ones now in use.

A vessel so constructed must necessarily be very strong, and is especially adapted for carrying acidified liquids, such as fire-extinguishing chemicals, soda-water, &c. As its center is cylindrical and its corrugated ends are of less diameter than said center, it can be conveniently rolled upon the floor like a barrel, and will withstand great pressure from within and without.

What I claim is—

1. The herein described vessel composed of a single piece of sheet metal, its center being smooth and cylindrical and its ends provided with corrugations commencing at nothing near the center and growing deeper toward the ends so as to make the latter dome-shaped, all said corrugations being flattened, each upon the next in one direction around the vessel as and for the purpose set forth.

2. The herein described vessel composed of a single piece of sheet metal, its center being smooth and cylindrical except the bung, and its ends provided with corrugations commencing at nothing near the center and growing deeper toward the ends so as to make the latter dome-shaped, as and for the purpose set forth.

3. The herein described vessel composed of a single piece of sheet metal, its center being smooth and cylindrical and its ends dome-shaped, the material of the upper end being provided with corrugations commencing at nothing near the center and growing deeper toward but terminating short of the upper end, all said corrugations being flattened, and a neck piece having an interior annular groove in which the ends of the uppermost corrugations are soldered, as and for the purpose set forth.

4. The herein described vessel composed of a single piece of sheet metal, its center being smooth and cylindrical and its ends provided with approximately longitudinal corrugations commencing at nothing near the center and growing deeper toward the ends so as to make the latter dome-shaped, all said corrugations being flattened and those at the lower end of the vessel meeting at its axis and held in position by a coating of solder within the vessel, as and for the purpose set forth.

5. The herein described vessel composed of a single piece of sheet metal, its center being smooth and cylindrical and its ends rounding or dome-shaped, the material of such ends being provided with corrugations commencing at nothing near the center and curving inward and growing gradually deeper toward the ends, all said corrugations being flattened so as to extend spirally around the vessel, those at the upper end thereof terminating short of the axis and those at the lower end of the vessel meeting at its axis and held in position by a coating of solder within the vessel, and a neck having an interior annular groove into which the ends of the uppermost corrugations are soldered, as and for the purpose set forth.

In testimony whereof I affix my signature in presence of two witnesses.

EDWARD F. O'TOOLE.

Witnesses:
EDWD. E. LONGAN,
JNO. C. HIGDON.